US012512588B1

(12) United States Patent
Leifer et al.

(10) Patent No.: US 12,512,588 B1
(45) Date of Patent: Dec. 30, 2025

(54) EFFICIENT DETERMINISTIC NULLING METHOD AND APPARATUS (71) Applicant: BAE Systems Space & Mission Systems Inc., Broomfield, CO (US)

(72) Inventors: Mark C. Leifer, Boulder, CO (US); Stanton B. McMillan, Louisville, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 435 days.

(21) Appl. No.: 18/072,951

(22) Filed: Dec. 1, 2022

Related U.S. Application Data

(60) Provisional application No. 63/285,161, filed on Dec. 2, 2021.

(51) Int. Cl.
| | | |
|---|---|---|
| *H01Q 3/26* | (2006.01) | |
| *H01Q 3/00* | (2006.01) | |
| *H01Q 3/01* | (2006.01) | |

(52) U.S. Cl.
CPC ............ *H01Q 3/26* (2013.01); *H01Q 3/2611* (2013.01); *H01Q 3/00* (2013.01); *H01Q 3/01* (2013.01)

(58) Field of Classification Search
CPC .......... H01Q 3/26; H01Q 3/2611; H01Q 3/01; H01Q 3/00
USPC ................................................. 342/372, 368
See application file for complete search history.

(56) References Cited

U.S. PATENT DOCUMENTS

| | | | |
|---|---|---|---|
| 4,017,867 A * | 4/1977 | Claus ................... | H01Q 3/2617 342/368 |
| 4,937,584 A | 6/1990 | Gabriel et al. | |
| 6,603,427 B2 * | 8/2003 | Cai ......................... | G01S 3/043 342/382 |
| 7,026,989 B1 * | 4/2006 | Minkoff .................... | H01Q 3/36 342/372 |
| 7,068,219 B2 | 6/2006 | Martin et al. | |
| 7,254,199 B1 * | 8/2007 | Desloge ................. | H04B 7/086 375/350 |
| 8,274,429 B2 * | 9/2012 | Zoubir ................... | H04B 17/21 342/174 |
| 9,207,313 B2 | 12/2015 | Schuman | |

(Continued)

FOREIGN PATENT DOCUMENTS

| | | | | |
|---|---|---|---|---|
| CN | 108631851 A | * | 10/2018 | .......... H04B 7/0456 |
| GB | 2328800 A | * | 3/1999 | ............. H01Q 1/246 |

OTHER PUBLICATIONS

Aghajanzadeh et al. "Phase-Only Pattern Nulling of Planar Antenna Arrays in mmWave Communications," IEEE, 2021 Wireless Telecommunications Symposium (WTS), pp. 1-3.

(Continued)

*Primary Examiner* — Chuong P Nguyen (74) *Attorney, Agent, or Firm* — Sheridan Ross P.C.

(57) ABSTRACT

Systems and method for placing nulls at desired locations within a beam pattern of a phased array antenna are provided. According to embodiments of the present disclosure, a weight vector solution for controlling operating parameters of the M elements of the array antenna such that a beam pattern incorporating one or more desired nulls is obtained by performing operations on an N×N matrix, where N is equal to a number of vectors used to describe the nulls. The nulls can be placed at arbitrary locations within the beam pattern, and can be formed with arbitrary depths.

20 Claims, 6 Drawing Sheets

(56) References Cited

U.S. PATENT DOCUMENTS

| | | | |
|---|---|---|---|
| 9,300,501 B2 | 3/2016 | Jindal | |
| 9,640,866 B2* | 5/2017 | Kumar | H04B 7/088 |
| 10,177,451 B1* | 1/2019 | Baraban | H04B 1/1027 |
| 2005/0285785 A1* | 12/2005 | Martin | H01Q 3/2611 |
| | | | 342/372 |

OTHER PUBLICATIONS

Bui-Van et al. "Direct Deterministic Nulling Techniques for Large Random Arrays Including Mutual Coupling," IEEE Transactions on Antennas and Propagation, Nov. 2018, vol. 66, No. 11, pp. 5869-5878.

Fernandez et la. "Fast Algorithm for Two-Dimensional Deterministic Nulling," IEEE, 2019 IEEE Radar Conference (RadarConf), 2019, pp. 1-6.

Gabriel "Using Spectral Estimation Techniques in Adaptive Processing Antenna Systems," IEEE Transactions on Antennas and Propagation, Mar. 1986, vol. AP-34, No. 3, pp. 291-300.

Steyskal "Synthesis of Antenna Patterns with Prescribed Nulls," IEEE Transactions on Antennas and Propagation, Mar. 1982, vol. AP-30, No. 2, pp. 273-279.

Steyskal "Simple Method for Pattern Nulling by Phase Perturbation," IEEE Transactions on Antennas and Propagation, Jan. 1983, vol. AP-31, No. 1, pp. 163-166.

Von Aulock "Properties of Phased Arrays," Proceedings of the IRE, Oct. 1960, vol. 48, No. 10, pp. 1715-1727.

Yu et al. "Antenna Pattern Synthesis with Multiple Discrete and Continuous Nulls," IET International Radar Conference 2015, pp. 1-7.

* cited by examiner

EFFICIENT DETERMINISTIC NULLING METHOD AND APPARATUS

CROSS-REFERENCE TO RELATED APPLICATION

This application claims the benefit of U.S. Provisional Patent Application Ser. No. 63/285,161, filed Dec. 2, 2021, the entire disclosure of which is hereby incorporated herein by reference.

FIELD

Systems and methods for placing nulls at desired locations within a beam pattern of an array antenna are provided.

BACKGROUND

Array antennas, including but not limited to phased array antennas, are used in transmitting and receiving beams of electromagnetic radiation in a wide variety of applications. In operation, the individual elements of the antenna are controlled to produce a desired beam pattern. For example, it is often desirable to produce a beam pattern having a main beam aligned in a direction of interest, while at the same time attenuating the sidelobes or beams in directions that are not of interest. This general configuration can increase the signal to noise ratio of the overall signal received by the antenna for a signal source aligned with the main beam.

Phased array antennas can be controlled to lower sidelobe levels or to place a null in the direction of jammers or other interfering signals, or to avoid transmitting a signal to an undesired location. Particularly for large arrays, which can include hundreds, thousands, or even tens of thousands of elements, conventional nulling methods for producing multiple antenna pattern nulls in predetermined directions either work poorly or require a large amount of computing resources. Iterative approaches can suffer from poor nulling performance, including the creation of shallow nulls, nulls that degrade if they are in close proximity to one another, poor performance when nulling close to the main beam, null solutions that are locally rather than globally optimal, and slow or no convergence to a solution. Deterministic or closed-form nulling algorithms offer optimized nulling performance, but require the inversion or decomposition of an M×M matrix, where M is the number of array elements. The use of such algorithms in connection with large arrays is therefore either computationally demanding, in both the number of operations and memory requirements, or infeasible.

SUMMARY

Embodiments of the present disclosure are directed to systems and methods for placing nulls at desired locations within a beam pattern of an array antenna. More particularly, a null is placed in each of one or more desired locations within the beam pattern. In addition, multiple nulls can be placed within a beam pattern without interfering with or degrading each other. Moreover, the determination of individual antenna element signal parameters required to create the multiple nulls can be performed using far fewer computing resources than other techniques. Embodiments of the present disclosure are applicable to both signal reception and transmission.

Methods in accordance with embodiments of the present disclosure provide an algorithm having a closed form that can produce an arbitrary number of optimally deep nulls in a beam produced by an array antenna. The methods require only the eigenvalue decomposition of an N×N matrix, where N is equal to the number of vectors used to describe or specify the nulls. More particularly, a simple null can be formed from a single vector, while a null of complex shape can be formed using a plurality of vectors, where each vector in the plurality of vectors corresponds to a simple null. Accordingly, unless specifically denoted as incorporating a single or individual null, a null formed in an antenna pattern in accordance with embodiments of the present disclosure can include one or more individual nulls that each correspond to a single vector. As N is typically relatively small, the algorithm is computationally efficient as compared to alternative approaches. As a result, embodiments of the present disclosure can be used in real-time or near real-time applications. In addition, methods as disclosed herein can produce arbitrarily deep nulls. Moreover, the nulls can be arbitrarily close together, and can also be placed close to the peak of the main beam.

Systems in accordance with embodiments of the present disclosure include an array antenna having any number of elements. In an exemplary embodiment, the elements can be disposed in a two-dimensional, planar array. The spacing between elements can be regular or arbitrary. The antenna elements can be connected to a feed network that includes analog, digital, or a combination of analog and digital electronics. The feed network can be controlled to selectively vary parameters associated with signals received by or transmitted from the elements, thereby enabling the beam produced by the array antenna to be shaped and steered. Moreover, control electronics for implementing element control algorithms, including a closed form algorithm for placing one or more nulls in desired locations within the beam pattern, are provided to selectively operate the feed network.

Additional features and advantages of embodiments of the disclosed systems and methods will become more readily apparent from the following description, particularly when taken together with the accompanying drawings.

DETAILED DESCRIPTION

Figure 1:
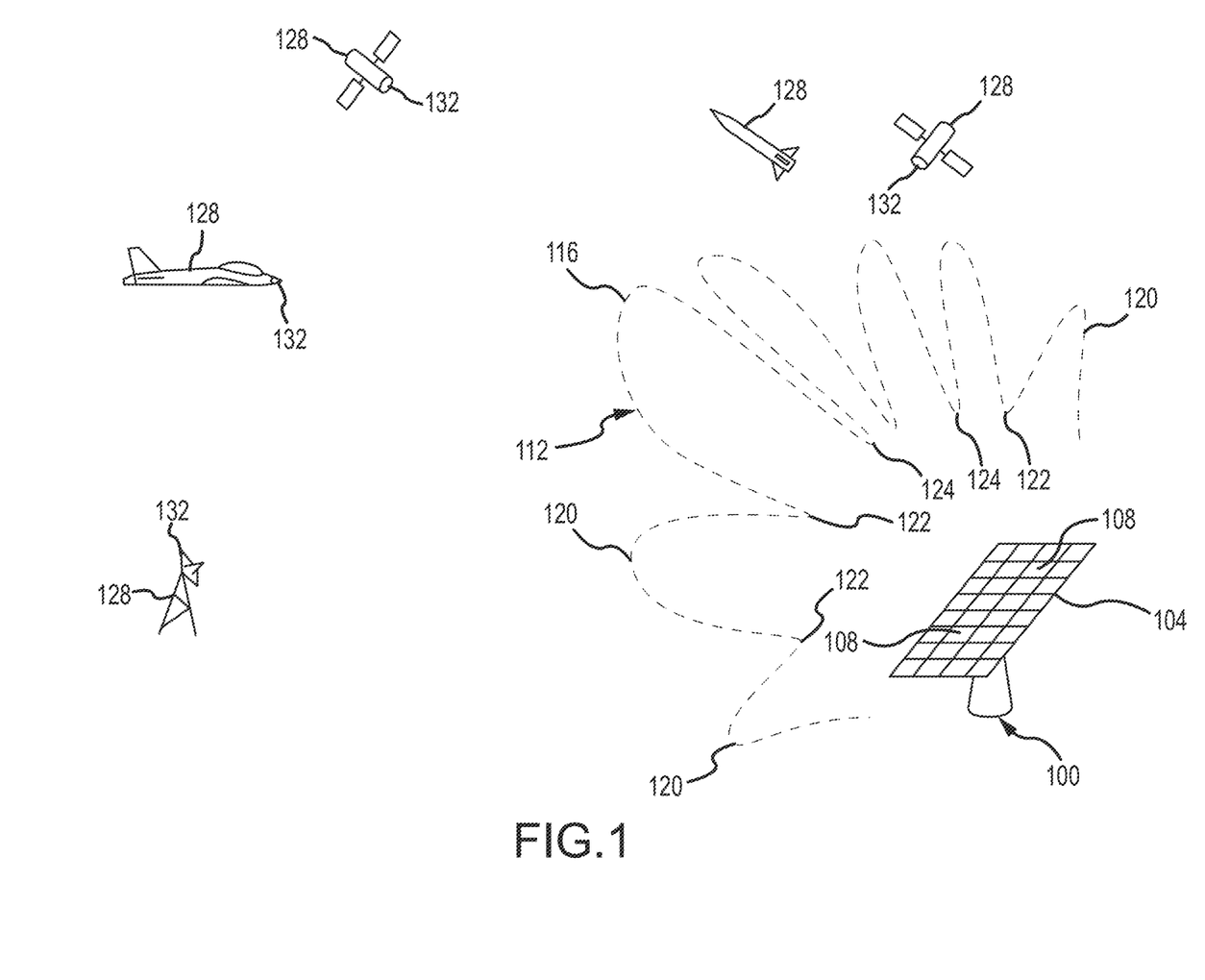
FIG. 1 depicts an array antenna in an example operating environment in accordance with embodiments of the present disclosure.

FIG. 1 depicts an environment in which an antenna system 100 including an array antenna 104 is operated as a source (transmitter), receiver, or both a source and a receiver of a radio frequency (RF) signal or signals. In accordance with embodiments of the present disclosure, the array antenna 104 includes a number of antenna elements 108. In accordance with at least some embodiments of the present disclosure, the array antenna 104 includes a large number (e.g. more than 500) elements 108. The elements 108 can be disposed in a one-, two- or three-dimensional array. In accordance with still further embodiments, the antenna elements 108 are disposed in rows and columns. Moreover, the antenna elements 108 may be disposed in a planar array. As can be appreciated by one of skill in the art after consideration of the present disclosure, the array antenna 104 can be operated to produce a beam or signal pattern 112. In a typical implementation, the beam pattern 112 features a main beam 116, a plurality of side lobes 120, and a plurality of nulls 122 that occur as part of the quiescent beam pattern 112. The beam pattern 112 can be shaped or steered by varying the operating parameters of the elements 108. As described herein, embodiments of the present disclosure additionally allow any number of deliberately formed nulls 124 to be placed within the beam pattern 112. Moreover, in accordance with embodiments of the present disclosure, a null 124 can be placed at any location within the beam pattern 112, including in close proximity to or overlapping another null 124. In addition, embodiments of the present disclosure provide systems and methods that enable a broad null 124 to be formed from multiple individual or simple nulls that are each associated with a corresponding null vector. As can be appreciated by one of skill in the art after consideration of the present disclosure, the array antenna 104 can be operated to steer or shape the beam pattern 112 to selectively direct energy toward or receive energy from areas of the operating environment. Moreover, embodiments of the present disclosure enable a selected null to be formed in a predetermined location within the beam pattern, even where the beam pattern includes additional nulls that overlap or that otherwise interact with the selected null. In accordance with further embodiments of the present disclosure, multiple nulls can be added to a beam pattern simultaneously at selected locations, without the nulls interacting such that they degrade one another.

In a typical operating scenario for an antenna system 100 as disclosed herein, various objects 128, at least some of which may include communication endpoints 132, are present in the operating environment. The antenna system 100 can then be operated to detect objects 128 and/or to support communications with communication endpoints 132 within that environment. For example, the main beam 116 can be steered toward an area containing an object 128 being tracked by an antenna 104 operating as a radar. As another example, the main beam 116 can be steered toward an area containing an object 128 that includes a communication endpoint 132 where the antenna 104 is operating as another communication endpoint 132. By placing the main beam 116 such that it encompasses or is pointed towards an object 128 or communication endpoint 132, the gain of the antenna 104 relative to that object 128 or communication endpoint 132 can be maximized. With respect to an object 128 or endpoint 132 for which a lower gain amount than may be provided by the main beam 116 is sufficient, the beam pattern 112 can be formed or pointed such that a side lobe 120 is directed toward that object 128 or endpoint 132.

With respect to at least some objects 128 or communication endpoints 132, it may be desirable to limit the relative gain of the array antenna 104 by placing nulls 124 at locations within the beam pattern 112 corresponding to those objects 128 or communication endpoints 132. For example, unwanted RF energy, whether from a jammer or some other source or endpoint 132, can interfere with the receipt of desired RF signals. Moreover, it can be desirable to include multiple nulls 124 within a beam pattern 112, even where unwanted RF energy is emitted from a single endpoint 132, to limit or cancel the effect of multipath interference. As another example, it may be desirable to limit the amount of energy transmitted by the array antenna 104 that is incident on an object 128 or communication endpoint 132 in the form of or including a system that might become inoperable while receiving the transmitted energy, or that might even be damaged by the transmitted energy. As still another example, it may be desirable to limit the amount of energy transmitted towards certain areas within an operating environment to reduce the likelihood that signals transmitted by the antenna array 104 will be intercepted, or to reduce the likelihood that the presence or operation of the array antenna 104 will be detected.

Figure 2:
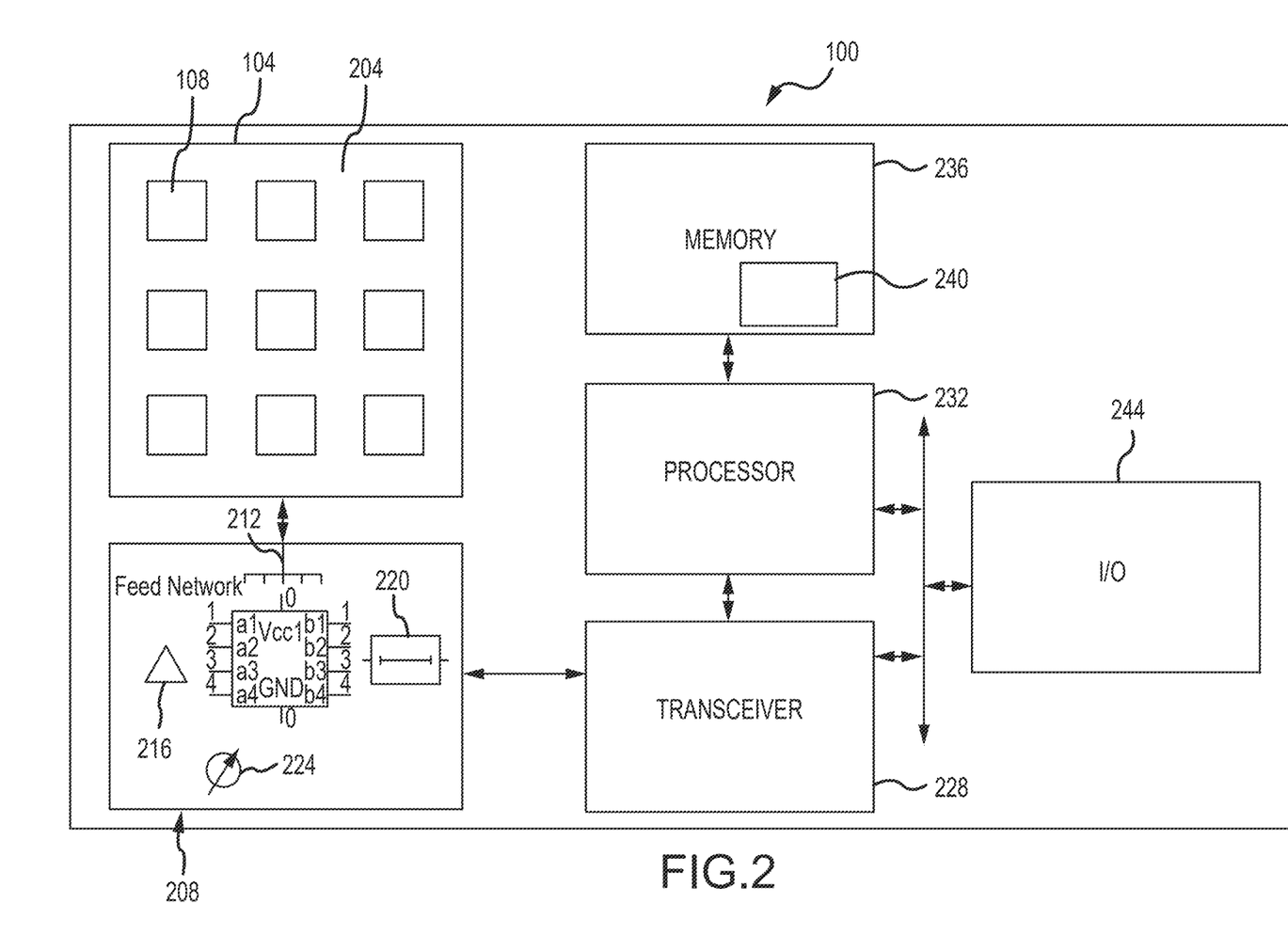
FIG. 2 depicts components of an array antenna system in accordance with embodiments of the present disclosure.

FIG. 2 depicts components of an antenna system 100 having an array antenna 104 in accordance with embodiments of the present disclosure. The antenna elements 108 included in the array antenna 104 can be disposed on a support surface or substrate 204 in one or more rows and in a plurality of columns. Although depicted in the figure as having nine antenna elements 108 disposed in three rows and three columns, it should be appreciated that embodiments of the present disclosure can incorporate any number of elements 108. Moreover, although the array antenna 104 is shown as a square array on a planar substrate 204, other configurations are possible. For example, the antenna elements 108 can be disposed in a one-dimensional linear array, a two-dimensional array, or a three-dimensional array.

Each of the antenna elements 108 included in the array 104 are connected to a feed network 208. The feed network 208 can include various components, including but not limited to signal lines 212, amplifiers 216, attenuators 220, phase shifters 224, and the like. Individual components or sets of components of the feed network 208 can be provided for each antenna element 108. Alternatively, groups of antenna elements can share feed network 208 components. As can be appreciated by one of skill in the art after consideration of the present disclosure, the active components of the feed network 208 can be connected to control signal lines and power supply lines. Moreover, the components of the feed network 208 can include analog, digital, or a combination of analog and digital components.

Signals are passed between the feed network 208 and a transceiver 228. As used herein, a transceiver 228 can signify a receiver, a transmitter, or a combined receiver and transmitter. Depending on the end use of the array antenna 104, the transceiver 228 can operate to, for example, modulate and demodulate communication signals, send and receive radar signals, or send or receive other radio frequency signals or energy.

The antenna system 100 also generally includes one or more processors 232. A processor 232 can include a general purpose programmable processor, a field programmable gate array (FPGA), a controller, or other device capable of executing instructions, for example included in software or firmware. The processor 232 can operate to execute application programming 240 stored in a memory and/or data storage 236 to perform various functions, including the creation of nulls 124 at desired locations within a beam pattern 112 as described herein.

The memory or data storage 236 can include a digital memory device for the short- or long-term storage of program instructions, intermediate data products, null location data, or the like. As examples, the memory or data storage 236 can include RAM, DRAM, SDRAM, had disk drives (HDDs), flash memory or solid-state drives (SSDs), optical storage devices, or the like. In accordance with at least some embodiments of the present disclosure, multiple instances and types of memory and/or data storage 236 components are included in the antenna system 100.

The antenna system 100 can also include a communications or interface block 244. The interface block 244 can include one or more interfaces for supporting communications between the antenna system 100 and devices or systems that are co-located with or remote relative to the antenna system 100. In accordance with embodiments of the present disclosure, the interface block 244 can comprise a communications interface that receives instructions or data from other devices or systems regarding a location or locations within a beam pattern 112 in which one or more nulls 124 are to be placed. The interface block 244 can also include one or more communications interfaces that provide output in the form of communication signals or object location information received by the array antenna 104 to other systems or devices, directly or over a communications network. The interface block 244 can alternatively or additionally include one or more communication interfaces that receive communication signals for transmission, or that receive instructions for generating beams of RF energy.

Figure 3:
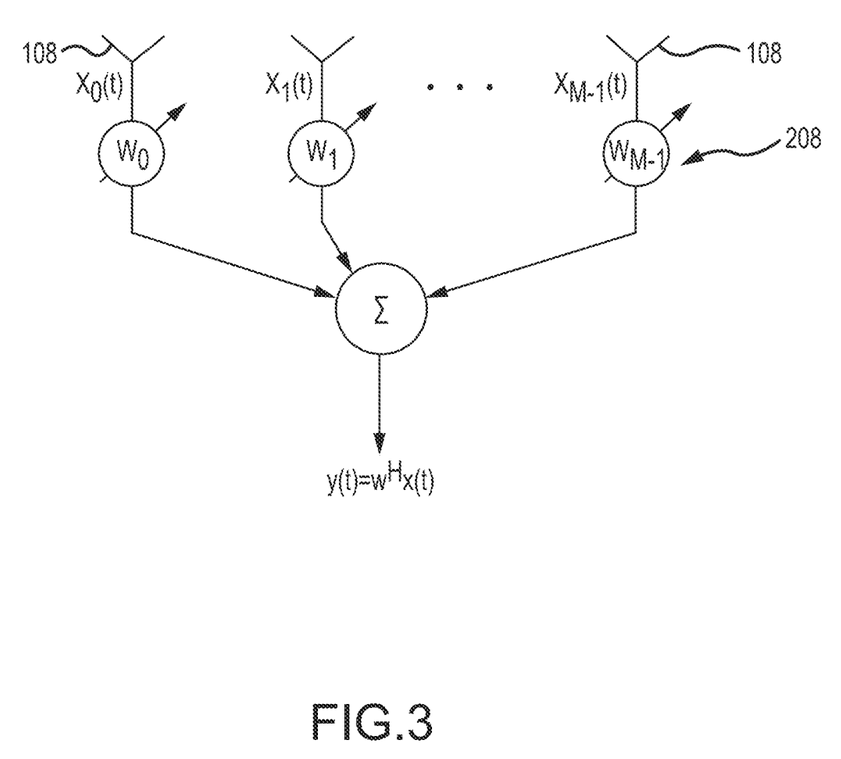
FIG. 3 depicts an array beam forming operation in accordance with embodiments of the present disclosure.

FIG. 3 depicts an array beam forming operation in accordance with embodiments of the present disclosure. When the time-domain signals $x_m(t)$ received at each antenna are placed in a vector $x(t)$, the beamformed output signal of FIG. 3 is $$y(t) = w^H x(t)$$

where the weight vector w is a vector containing weights (scale factors) that are applied to the antenna signals and where H denotes the Hermitian, or complex conjugate, transpose operation. In words, weights are applied to the signals received at the array antenna elements 108 and they are summed to create a beamforming operation. Beamforming may be implemented: in hardware using analog attenuators and phase shifters or time-delay units for weighting and power combiners for summation; digitally in a processor, in the case that a sampler or digital receiver is provided at every element; or a combination of the above, in which partial beamforming is performed with analog hardware within a subarray but each subarray is provided with a digital receiver so beamforming is completed digitally. Embodiments of the present disclosure are directed to determining w when multiple predetermined array pattern nulls are to be combined.

It is assumed for purposes of this disclosure that vectors a are available that describe, or can produce, nulls individually. The method of this disclosure is general in that it optimally combines multiple vectors a that have been produced by any available method (for example, by iterative, closed-form, deterministic, static or adaptive algorithms or by empirical means) and that collectively describe nulls or null regions 124 of any shape. One example concerns plane waves incident on the array 104. Consider an array of M identical antenna elements 108 located at positions $r_m$, m=0, 1, . . . M−1 within the array 104. The spatial information describing an incident narrowband plane wave with wavevector k is contained in an array manifold vector (AMV) a of unit norm whose components are $$a_m(k) = \frac{\exp(-ik \cdot r_m)}{\sqrt{M}}$$

This AMV is one example of a vector a. In Cartesian coordinates, $$r_m = x_m \hat{x} + y_m \hat{y} + z_m \hat{z}$$

and $$k = k(u\hat{x} + v\hat{y} + w\hat{z})$$

where k is the wavenumber $k=|k|=2\pi/\lambda$, with $\lambda$ the wavelength. The (u,v,w) coordinates are related to standard spherical polar coordinates by
u=sin θ cos φ
v=sin θ sin φ
w=cos θ

The letter w will refer to a weight from now on since the coordinate w will not be needed. The sensitivity pattern of the array during reception is $$E(k) = EF \cdot AF = f(k) \left[ \sum_{m=0}^{M-1} w_m \exp(-ik \cdot r_m) \right]$$

where f(k) is an element factor (EF) and $w_m$ is a scalar weight applied to the mth element. (Note that the quantity measured in a test range and generally of interest in practical applications is the power pattern $|E(k)|^2$.) The weight vector w of scalar weights shapes the sensitivity pattern, while the element factor is fixed because it is the radiation pattern of a single physical radiating element, many of which make up the array. Accordingly, it is the term in brackets, called the array factor (AF), that produces shaped beams and nulls under the control of the values that we place into w. The AF is the quantity of primary interest in adaptive beamforming and deterministic nulling applications. Since the directional pattern of the desired incident signal is presumed known, we set the default array pattern by specifying a quiescent steering vector b consisting of weights that produce the desired quiescent directivity towards the source. Sensitivity towards an incoming plane wave of wavevector k is maximized by setting the steering vector equal to the vector a, b=a(k), but b can readily take forms that produce other quiescent patterns. The nulling algorithm produces a weight vector w that reproduces b as closely as possible while producing the desired nulls.

A traditional way to produce nulls in predetermined directions $k_n$, n=0, 1, . . . N−1, is to form an M×M covariance matrix containing the null direction information $$R = \sum_{n=0}^{N-1} \alpha_n a(k_n) a^H(k_n) + \sigma^2 I$$

Here constant an sets the depth of the nth null, H indicates the Hermitian conjugate (complex conjugate transpose), I is the M×M identity matrix and $\sigma^2$ is an effective noise power that ensures that R is positive semi-definite and that improves its condition number. The minimum variance distortionless response (MVDR) technique then provides the weight vector $$w_{nulls} = cR^{-1}b$$

where c is a constant that sets the quiescent pattern gain. The steering vector solution $w_{nulls}$ maintains high gain towards the desired signal while forming nulls in the N null directions. Since the number of computations required to invert a matrix scales approximately as $M^3$, however, inverting R is computationally painful or even unfeasible when the number M of elements in the array is very large. Note that this computational cost is incurred regardless of whether there are many nulls or just one.

Embodiments of the present disclosure provide a reduced dimensionality algorithm that is capable of forming nulls 124 within a beam pattern 112. In particular, embodiments of the present disclosure provide a method that reduces the dimensionality of the problem from M×M to N×N, producing potentially enormous savings in computational effort for large arrays since the number N of vectors required to form the nulls 124 is typically small. First, a linear combination of the null vectors is found that is orthogonal, thus ensuring that the nulls do not interact with or degrade each other. To do this, vectors for the desired nulls are placed into the columns of an M×N matrix A whose components are $A_{mn}=a_m(k_n)$, and the N×N matrix $$Z=A^H A+\sigma^2 I$$

is formed. A small amount of effective noise power $\sigma^2$ may be added to improve the conditioning of Z when nulls are located close together. Next, an eigenvalue decomposition is performed on Z to find both the diagonal matrix Λ whose entries contain the eigenvalues $\lambda_n$, n=0, 1, ... N−1, and the N×N unitary matrix U whose columns contain the corresponding eigenvectors. These are used to construct a set of N vectors that are linear combinations of the vectors and that are contained in an M×N matrix $$Y=AU\Lambda^{-1/2}$$

whose columns are orthogonal. The last matrix on the right in this expression scales each column of Y to have unit norm, so the column vectors in Y form a complete orthonormal set of basis vectors spanning the space of the null vectors. Each column vector, scaled by its projection onto the quiescent vector (term in parentheses below), is subtracted from the quiescent vector to give a weight vector w that forms nulls in the antenna sensitivity or beam pattern 112 at the desired locations $$w=b-Y(Y^H b)$$

in an operation that is reminiscent of (although different from) Gabriel's model for visualizing the formation of adaptive nulls. This steering vector solution may be updated each time one or more of the null directions $k_n$ changes and/or when the desired quiescent pattern (specified by b) changes.

As formed in at least some embodiments of the present disclosure, the nulls 124 are perfect, that is, the array pattern has zero amplitude at the locations within the resulting beam pattern corresponding to the nulls 124. In accordance with other embodiments of the present disclosure, nulls 124 can be formed that have a selected or limited null depth. In particular, it is possible to produce shallower nulls 124 that are just deep enough to satisfy the needs for a given application. To reduce the quiescent power pattern at the $n^{th}$ null location by a factor $1/\alpha_n^2$, the vectors making up the matrix A are weighted according to $$A_{mn}=\alpha_n a_m(k_n)$$

The next two steps proceed as before—an eigenvalue decomposition of the matrix $$Z=A^H A+\sigma^2 I$$

leads to the construction of the orthonormal basis $$Y=AU\Lambda^{-1/2}$$

The final step is modified, however, to scale each basis vector in the weight equation by values in the diagonal matrix $$C=I-\Lambda^{-1/2}$$

to produce the desired null depth. The modified weights are $$w=b-Y(CY^H b)$$

For applications where shallow nulls 124 suffice, this procedure produces weights that have lower taper loss or, equivalently, higher array efficiency, than those for "perfectly deep" nulls 124.

The treatment above used an AMV a appropriate to a plane wave for illustration, but the method of this disclosure is general in that it optimally combines multiple vectors a that have been produced by any available method (for example, by iterative, closed-form, deterministic, static or adaptive algorithms or by empirical means) and that describe nulls or null regions of any shape. As an example of a vector that is not generated by a plane wave, consider that the antenna 104 in a multipath scattering propagation environment may receive unwanted signals from a source through multiple paths of varying strengths and phases, the spatial properties of which are captured in a non-plane-wave AMV a. A null from this AMV a may be combined with plane wave or multipath nulls towards other sources, described by additional AMVs a, using the method of this disclosure. In other cases, such as when the signal from a broadband source is incident upon the array, the null shape is complicated and may require a collection of more than one vector a to describe it. The method of the present disclosure may be used to combine multiple such collections of vectors to provide a pattern with optimal nulls towards multiple broadband sources. Furthermore, nulls described by any mixture of individual AMVs and collections of multiple vectors may be combined using the method of the present disclosure as described above.

The treatment above was developed for signal reception. Weights that produce nulls 124 in the far-field pattern during transmission are related to the receive weights w found above by $w_T=w^*$. For a transmitting antenna array 104, of course, the direction of signal flow in the block diagram of FIG. 3 is reversed.

Figure 4:
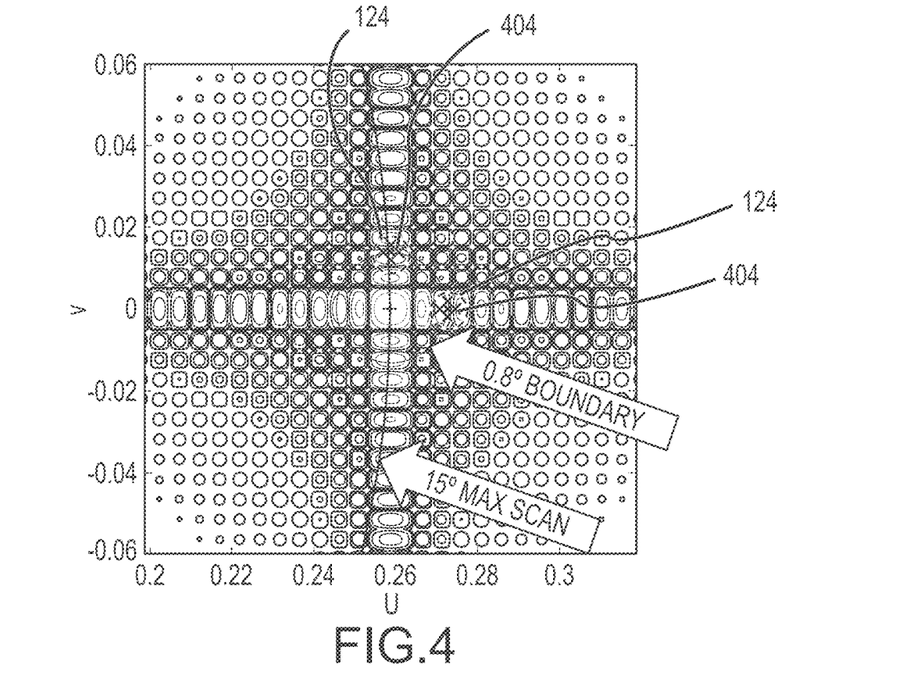
FIG. 4 depicts a quiescent beam pattern and locations of nulls produced by an array antenna system in accordance with embodiments of the present disclosure.
Figure 5:
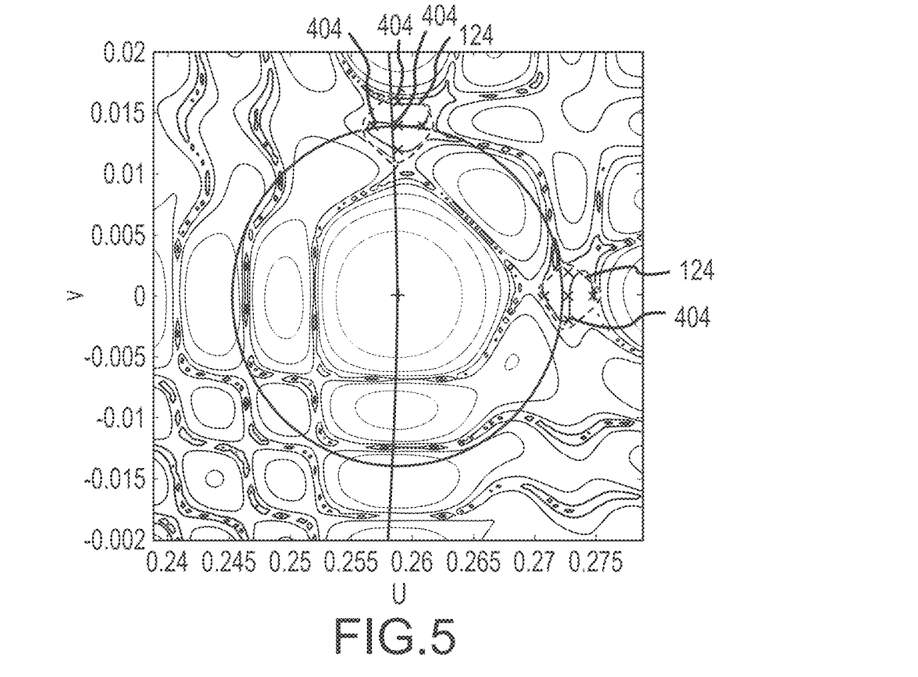
FIG. 5 depicts a power pattern obtained by applying weights to a quiescent beam pattern produced by an array antenna system in accordance with embodiments of the present disclosure.

As an example of transmit nulls produced with plane wave vectors, consider a notional M=65,536 element square planar array where it is desired to place two nulls 124 within 0.8 degrees of the main beam peak 116 when the beam peak 116 is steered up to 15 degrees off broadside. FIG. 4 depicts the quiescent transmit pattern with the locations indicated for two nulls 124 having shapes that are each formed from five individual nulls 404. The positions of the ten individual nulls 404 used to create the two nulls 124 in this example correspond to ten vectors that are stored in matrix A. Accordingly, in this example, N is equal to ten. FIG. 5 shows the antenna pattern 112 for the weight vector found with a version of the algorithm described above providing ten perfectly deep simple nulls 404 that are combined to form two broad nulls 124 that each contain five simple nulls 404. In this case, no effective noise was added to Z. The weights can, for example, be computed in Matlab on a common laptop in under 20 ms, permitting real-time tracking. Computation time can be considerably quicker with purpose-built code on a dedicated processor. Therefore, it can be appreciated that embodiments of the present disclosure allow broad pattern nulls 124 to be created using multiple vectors N that each form a simple null 404.

Figure 6:
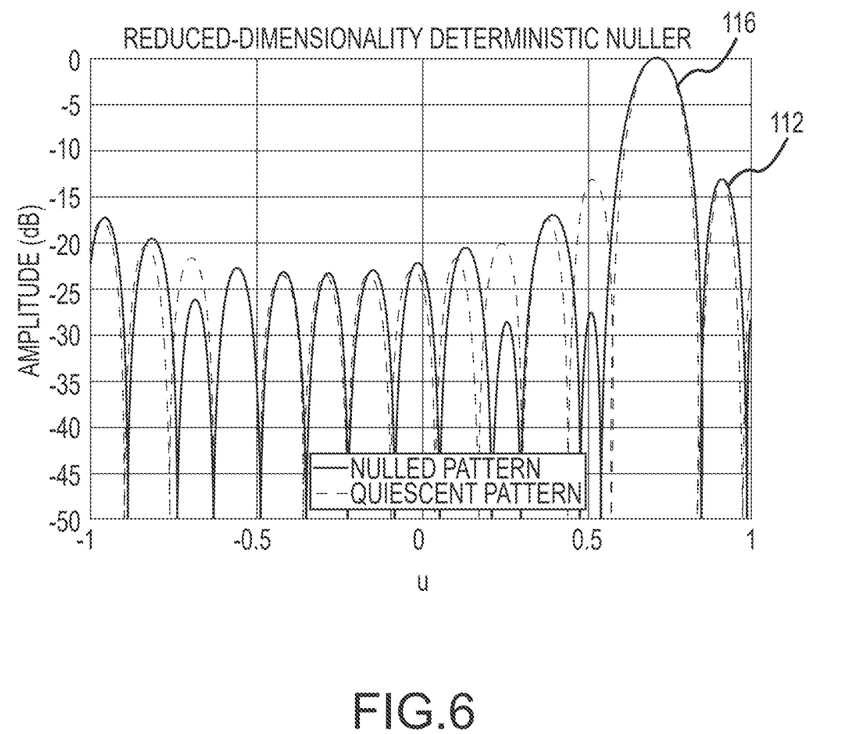
FIG. 6 depicts a beam pattern generated by an antenna array system in accordance with embodiments of the present disclosure.

In FIG. 6, a nulled beam pattern 112 produced by an M=15 element uniform linear array 104 with half-wavelength spacing and with the main beam 116 steered to 45 degrees is used to illustrate nulls 124 of limited depth. Nulls 124 are placed at the peaks of three quiescent sidelobes 120 whose positions are indicated by the vertical lines in FIG. 6. The scale factors $\alpha_p$ were set to provide null depths of [5, 10, 15] dB; weights produced by the version of the algorithm generated nulls 124 having these desired depths, as shown by the solid curve. The addition of effective noise power $\sigma^2$ was, again, unnecessary in this case.

The eigenvalue decomposition above could, in theory, be replaced by a singular value decomposition (SVD) of the matrix A $$A = D\Sigma E^H$$

where the singular values (the N significant non-zero entries in the M×N matrix $\Sigma$) equal $\Lambda^{1/2}$, the square roots of the eigenvalues found above, and where the orthogonal basis vectors are found in the N corresponding columns of the M×M matrix D. A similar SVD was used in a prior deterministic nulling approach, although the SVD was applied to $A^H$ instead of to A, which reversed the roles of D and E. The full M×M dimensionality of the matrices in the SVD formulation make it highly compute-intensive, however, putting it into the same class as the legacy MVDR algorithm mentioned earlier. Matrices found in computing the eigenvalue decomposition used in the present disclosure instead have dimension N×N, where N is a small number, making it more efficient and rapid when M is large. A weight computation method using eigenvalue decomposition is also mentioned in that prior approach, but it operates on matrix $AA^H$ which, again, has dimensionality M×M instead of N×N. Finally, that prior approach does not provide a method to control the null depth.

Figure 7:
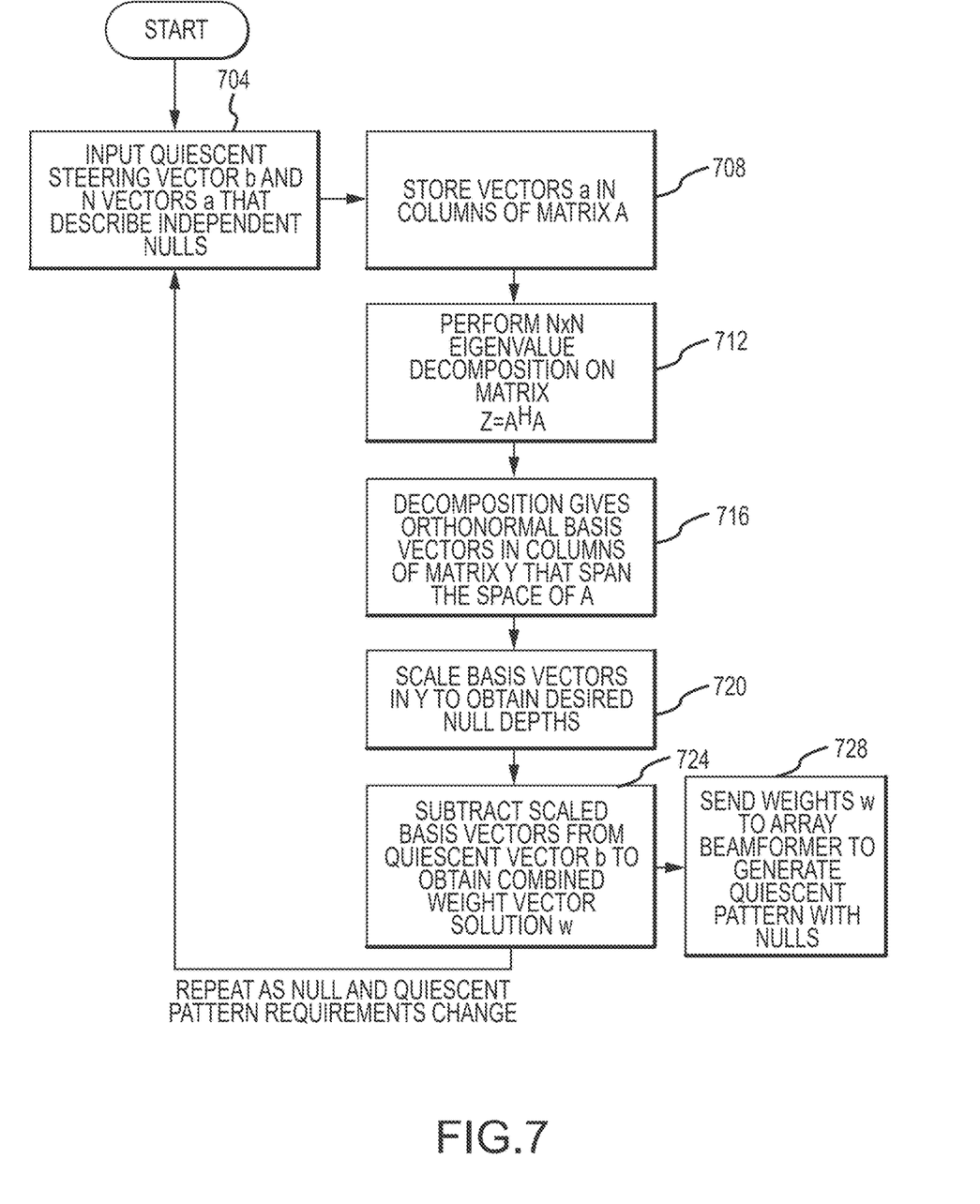
FIG. 7 depicts aspects of a method for forming nulls in an array antenna beam pattern in accordance with embodiments of the present disclosure.

Aspects of methods in accordance with embodiments of the present disclosure are depicted in FIG. 7. In particular, at step 704, N vectors a that describe the desired null patterns 124 and the steering vector b that generates the quiescent pattern 116 are provided to the antenna system 100. The vectors a describing the nulls 124 and the quiescent steering vector b can be provided to the antenna system 100 from some other system or controller or can be determined by the antenna system 100 itself. As can be appreciated by one of skill in the art after consideration of the present disclosure, a null or set of nulls 124 can be placed within an overall antenna beam pattern 112 to provide signal attenuation or cancellation with respect to selected objects 128, communication endpoints 132, or signals, including signals in the form of multipath interferers. The N vectors a are stored in the columns of a matrix A (step 708). An N×N eigenvalue decomposition of the matrix A, where N is equal to the number of vectors a, is then performed (step 712). At step 716, the decomposition is used to construct an orthonormal basis Y spanning the space A. The basis vectors y that form the columns of Y are then scaled to obtain desired null depths (step 720). Next, the scaled basis vectors a are subtracted from a fixed quiescent vector b to obtain a weight vector solution w (step 724). The weight vector w is then sent to the array beamformer, and in particular to the feed network 208, to generate the quiescent pattern with the desired nulls 124 formed therein (step 724). The process of determining the number and locations of nulls 124 can be continuously updated. In addition, the quiescent pattern can be changed or steered as in a conventional array antenna system 100.

Note that large arrays produce single nulls that are extremely narrow in angular extent—so narrow, in fact, that surveying, hardware and steering errors can cause the null to miss the intended absolute direction. Because algorithms in accordance with embodiments of the present disclosure can place individual nulls very close together without jeopardizing performance or computational accuracy, null areas in the form of broadened null regions can be produced by packing multiple individual nulls closely together in a cluster about the desired location. Clusters of five individual nulls to produce the two larger null areas in the transmit pattern shown in FIG. 5 demonstrate how transmit power can be suppressed in a region that is significantly broader than a single null and broader than the expected steering uncertainty and errors of the array system.

As discussed herein, conventional deterministic nulling algorithms are commonly either iterative or have an analytic closed form solution. Iterative algorithms, when applied to large arrays with, say, thousands of elements or more can suffer from a) poor nulling performance including shallow nulls, nulls that degrade if they are located too close together, or a limit on the number of nulls, b) poor performance when nulling close to the peak of the main beam, c) null solutions that are locally rather than globally optimal, and d) slow or no convergence to a solution. Legacy closed-form multiple null algorithms, on the other hand, offer optimal nulling performance but require the inversion or decomposition of an M×M matrix where M=number of array elements. For large arrays, this is either computationally demanding in both number of operations and in memory requirements, or infeasible.

In contrast to these legacy approaches, embodiments of the present disclosure provide a closed form, can be used to produce an arbitrary number of optimal deep nulls 124, and require only the inversion of a N×N matrix where N=number of vectors a needed to describe the desired nulls 124. Since N is typically small, the algorithm provided by embodiments of the present disclosure is computationally efficient.

1. The disclosed algorithm can combine vectors that generate any combination of plane wave, multipath and general complex-shaped nulls to produce an optimal overall null pattern.
2. Compared to iterative solutions, the disclosed algorithm
   a. Always produces a valid and theoretically optimal solution.
   b. Can produce arbitrarily deep nulls, can produce an arbitrary number of them, and can place them arbitrarily close together.
   c. Can place deep nulls close to the peak of the main beam.
3. Compared to legacy analytic solutions, the disclosed algorithm
   a. Requires only the decomposition of an N×N matrix where N=number of vectors needed to describe the nulls, even when the number of elements M is huge. It is thus computationally efficient.
   b. As a result, the algorithm operates quickly enough to adaptively track moving null locations in real time.
   c. When nulls are close together, resulting matrices can become ill-conditioned leading to unstable inverse solutions. The present method uses an eigenvalue decomposition that is observed to produce stable and accurate solutions even when inversion-based algorithms fail.

d. "Perfect" nulls can be formed (the pattern is zero at the null location) or shallower nulls can be specified.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for placing nulls in an antenna beam pattern, comprising:
   determining a desired beam pattern, wherein the desired beam pattern includes one or more nulls;
   determining N vectors a, wherein at least one vector a is determined for each null included in the beam pattern;
   storing the N determined vectors a in a matrix A;
   performing an N×N eigenvalue decomposition of matrix A, thereby defining a vector space;
   using decomposition, constructing an orthonormal basis Y spanning the space of A;
   scaling and subtracting basis vectors y that form columns of Y from a fixed quiescent vector b to obtain a weight vector solution w; and
   sending the weights w to an antenna system feed network to generate a quiescent beam pattern with each of the one or more nulls placed therein, wherein at least some of the one or more nulls have a location that corresponds to a location of an object.

2. The method of claim 1, wherein the antenna beam pattern is formed using an antenna having M elements, and wherein M is greater than 500.

3. The method of claim 1, wherein the object includes a communication endpoint.

4. The method of claim 1, wherein the object includes a radar endpoint.

5. The method of claim 1, wherein a depth of a first one of the nulls is different than a depth of a second one of the nulls.

6. The method of claim 1, wherein at least a first one of the one or more nulls includes at least first and second individual nulls, wherein the first individual null is created using a first vector a, wherein the second individual null is created using a second vector a, and wherein an area of the first individual null at least partially overlaps an area of or otherwise interacts with the second individual null.

7. The method of claim 1, wherein at least some of the nulls have a selected shape.

8. The method of claim 1, wherein at least some of the vectors produce nulls that partially overlap or that otherwise interact with one another.

9. The method of claim 1, wherein multiple vectors a are determined for at least a first one of the one or more nulls.

10. The method of claim 1, wherein the vectors are produced by any method.

11. The method of claim 1, wherein at least one of the vectors is produced by one of an iterative, closed-form, deterministic, static, or adaptive algorithm.

12. The method of claim 1, wherein at least one of the vectors is produced by empirical means.

13. The method of claim 1, wherein at least a first one of the nulls has an area described by a first array manifold vector that includes a plurality of vectors a, and wherein at least a second one of the nulls has an area described by a second array manifold vector that includes a second plurality of vectors a.

14. A system for generating an antenna beam having a plurality of nulls, comprising:
   an antenna system, including:
      an array of antenna elements, wherein a spacing between adjacent antenna elements is known, and wherein the antenna elements lie in a first plane;
      a feed network, wherein each element in the array of antenna elements is connected to the feed network;
      a radio frequency transceiver, wherein the feed network connects the radio frequency transceiver to each of the antenna elements in the array of antenna elements; and
   a processor, wherein the processor is operable to execute instructions to control parameters of the feed network to place the plurality of nulls at desired locations within a beam pattern produced by the antenna system, wherein the instructions include instructions to:
      determine N vectors a, wherein at least one vector a is determined for each of the desired null locations;
      place each of the N vectors a in a matrix A, thereby defining a vector space;
      perform an N×N eigenvalue decomposition on the matrix A;
      construct an orthonormal basis Y spanning the space of A;
      scale and subtract basis vectors y that form columns of Y from a fixed quiescent vector b to obtain a weight vector solution w; and
      apply the weights w to control the feed network and generate a quiescent pattern with the nulls.

15. The system of claim 14, wherein the array is a two-dimensional array.

16. The system of claim 14, wherein the antenna system includes M antenna elements, and wherein M is greater than 500.

17. The system of claim 14, wherein the antenna system is part of a communication endpoint.

18. The system of claim 14, wherein the antenna system is part of a radar endpoint.

19. The system of claim 14, wherein the processor is provided as part of the antenna system.

20. A non-transitory, computer-readable medium comprising a set of instructions which, when executed by a processor, causes the processor to control parameters of a feed network of an antenna system to generate an antenna beam having a plurality of nulls placed at desired locations within a beam pattern by:
   determining N vectors a, wherein at least one vector a is determined for each of the desired null locations;
   placing each of the N vectors a in a matrix A, thereby defining a vector space;
   performing an N×N eigenvalue decomposition on the matrix A;
   constructing an orthonormal basis Y spanning the space of A;

scaling and subtracting basis vectors y that form columns of Y from a fixed quiescent vector b to obtain a weight vector solution w; and applying the weights w to control the feed network and generate a quiescent beam pattern with the nulls, wherein at least one of the nulls has a location that corresponds to a location of an object.

\* \* \* \* \*